Sept. 4, 1956          H. M. WISENBAUGH          2,761,529
TRACTOR-TRAILER BRAKE SYSTEM
Filed March 10, 1951
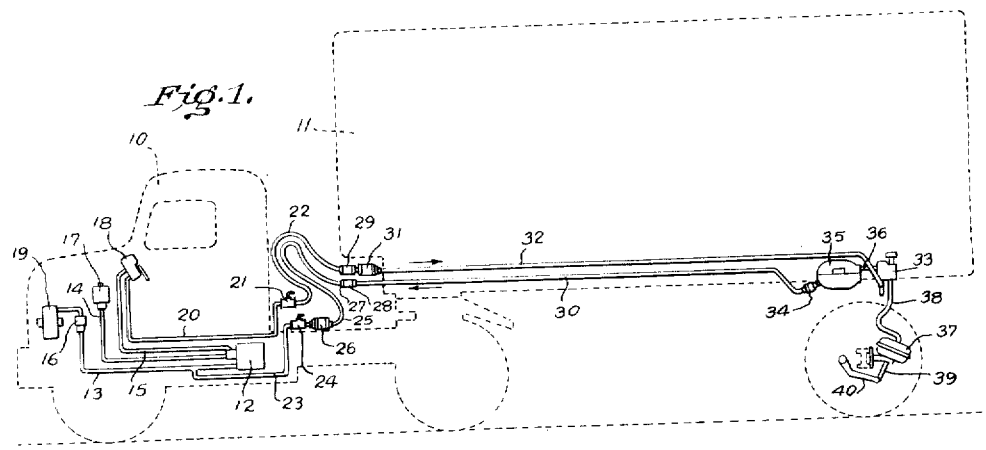
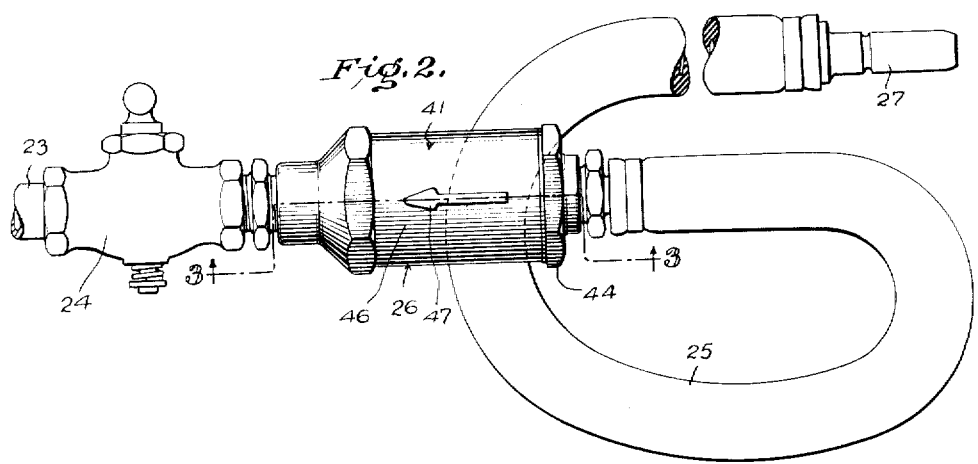
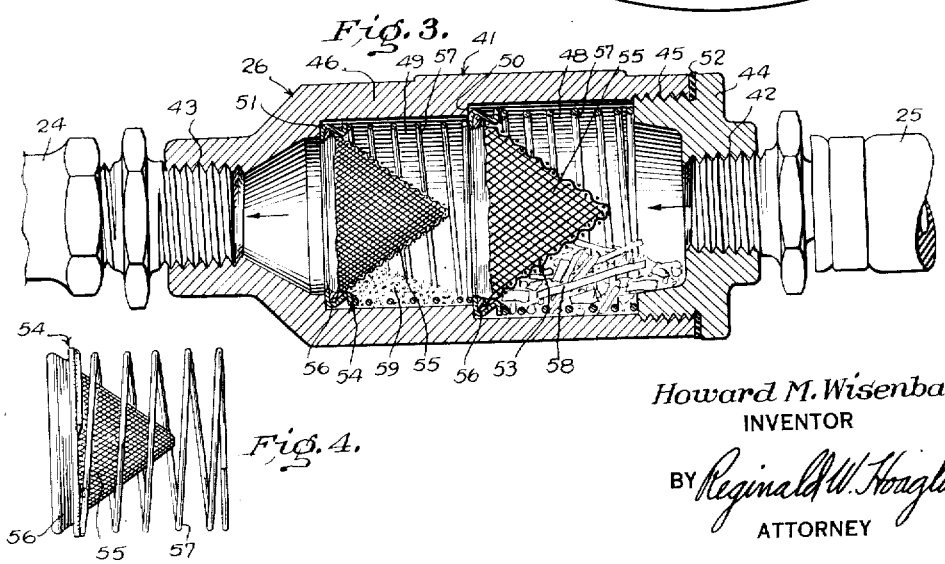
Howard M. Wisenbaugh
INVENTOR
BY Reginald W. Hoagland
ATTORNEY

United States Patent Office 2,761,529
Patented Sept. 4, 1956

2,761,529

TRACTOR-TRAILER BRAKE SYSTEM

Howard M. Wisenbaugh, Flint, Mich.

Application March 10, 1951, Serial No. 214,951

2 Claims. (Cl. 188—3)

This invention comprises novel and useful improvements in tractor-trailer brake systems, especially vacuum brake systems, and pertains more specifically to a braking system for preventing circulation therein of foreign matter that may have entered disconnected ends of lines of the system at the hose connections of the tractor to the trailer during disconnection of the tractor from the trailer.

Air cleaners or filters are now commonly used at the normal air intake to brake systems and perform satisfactorily in keeping the system clean of foreign matter while the hose connections between the tractor and trailer remain connected. However, when trailers are parked and uncoupled from the tractors for loading, unloading, or for other reasons, and the tractors are "bob-tailing" to other locations for pickups and deliveries, such cleaners or filters are useless in preventing foreign matter, such as mud, sticks, and stones, from becoming deposited in the open ends of the lines of the brake system on both tractor and trailer and being circulated in the braking system upon coupling of the lines of the system. Special sockets and plugs have been used for closing disconnected ends of the lines, but they are seldom used by the drivers and therefore have proven unsatisfactory. The lodging of a small stick, such as a match stem, or a pebble under the vacuum check valve that holds a vacuum in the system while the engine of the tractor is idling or stopped can hold this valve open and render the brakes of the trailer useless. Also, such foreign matter located in the emergency check valve or the relay valve or the vacuum tank of the trailer can cause the trailer brakes to fail when the tractor is uncoupled therefrom. Furthermore, by continually permitting the entrance of gritty foreign matter into the system, excessive wear on expensive working parts of the system can occur. Even engine parts emergency check valve or the relay valve at the vacuum system when vacuum is obtained from the intake manifold, and repairs to such parts or replacement thereof are soon required.

It is therefore proposed to provide filters in lines of a brake system between the tractor and trailer for catching and retaining foreign matter which may become deposited in both ends of both lines while said lines are disconnected.

More specifically, it is an important object of the invention to provide filters, each constructed with a rugged casing which will withstand abusive treatment and into which are arranged spaced screens of different size mesh material, dividing the recess in the casing into a number of compartments for the accumulation of a considerable amount of foreign matter before complete obstruction of passage through the screens.

Another object of the invention is to provide filters as outlined above wherein the screens and their supporting elements are removable as units from stepped seats in the casing for cleaning or replacement and to construct the screens of cone shapes for increasing the screening areas thereof.

It is also an object of the invention to provide a filter of the above-indicated character which can be conveniently and efficiently installed on present equipment, which is substantial in construction, which can be manufactured economically, and which will be thoroughly efficient and practical in use.

These, together with various auxiliary features and objects of the invention which will later become apparent as the following description proceeds, are attained by the present invention, a preferred embodiment of which has been illustrated, by way of example only, in the accompanying drawing, wherein:

Figure 1 diagrammatically illustrates in full lines a tractor-trailer vacuum brake system with the improved filters arranged therein and showing in dotted lines the outlines of a tractor and trailer;

Figure 2 is an elevation of a filter showing the same connected between a cutoff valve and hose connection of the tractor;

Figure 3 is a longitudinal section through a filter taken on line 3—3 of Figure 2; and Figure 4 is an elevation of a screen unit removed from the casing.

Referring now more specifically to the accompanying drawings, wherein like numerals designate similar parts throughout the various views, attention is directed first to Figure 1, wherein it will be seen that there is diagrammatically indicated with dotted lines a tractor 10 and a trailer 11, and with full lines, a vacuum brake system with parts thereof carried by the tractor and coupled to parts carried by the trailer. The vacuum brake system shown operates the trailer brakes and is closely synchronized with a hydraulic brake system for the tractor upon application and release of the brakes of both units. For purposes of clarity, the parts of the hydraulic braking system that actuate the brakes of the tractor have been omitted. The various elements of the system shown on the tractor 10 consist of the usual hydrovac 12 connected by lines 13, 14, and 15 to a vacuum check valve 16, an air inlet cleaner 17, and a trailer control valve 18, respectively. The vacuum check valve 16 in turn is shown connected to a pump 19, but in some cases, is connected to the interior of the intake manifold of the engine of the tractor (not shown) for creating the necessary vacuum. Also connected to the tractor control valve 18 is a control line 20 leading to a cutoff valve 21 which has a hose 22 connected to the opposite side thereof. A vacuum line 23 is shown tapped into the line 13 and is connected to another cutoff valve 24. The hydrovac 12, which can be termed a hydraulically actuated vacuum tank, is controlled in its operation by the pressure of brake fluid from the master cylinder of the tractor brake system (not shown) for causing a drop in vacuum in the control line 20 which affects mechanisms to be described that operate the trailer brakes upon operation of the tractor brakes. Interposed between the cutoff valve 24 and a hose 25 of the vacuum line is one of the improved filters, designated by the numeral 26, while on the opposite end of the hose 25 is a plug 27 of a hose coupling 28. The hose 22 of the control line has a like plug of a coupling 29 on its end opposite to that connected to the cutoff valve 21. Both cutoff valves 21 and 24 are closed before disconnecting the coupling 28 in the vacuum line and the coupling 29 in the control line of the tractor and trailer, and are opened upon connection of said couplings for operation of the brakes of the trailer.

The coupling 28 is secured to the forward end of a vacuum line 30 carried by the trailer 11, while the coupling 29 is connected to one end of another of the improved filters, designated by the numeral 31, which has connected to its other end the forward end of a control line 32 also carried by the trailer. The control line 32 connects to a relay valve 33, while the vacuum line 30 has connected thereto an emergency check valve 34 which is connected to a vacuum tank 35 that in turn is connected to the relay valve 33 by a short line 36. Leading from the relay valve 33 to a pair of brake chambers 37 (only one being shown) is a Y line 38. Plungers 39 operated by the brake chambers 37 are connected to brake arms 40 for applying the brakes of the trailer.

The improved filters 26 and 31 are identical in construction, each having a casing 41 with a threaded inlet opening 42 at one end and a threaded outlet opening 43 of the same size at the opposite end, the inlet opening 42 being in an end plug 44 threaded, as at 45, into an open end of an enlarged cylindrical body portion 46 of the casing, while the outlet opening 43 is in a reduced end formed as a part of the body portion. By having the threads of both inlet and outlet openings of the same size, attachment of either end of a filter 26 or 31 to similarly sized pipe-threaded parts of different parts of the system can be made in accordance with the direction of suction of vacuum through the lines to which the filters are attached, there being an arrow 47 on the cylindrical body portion 46 which points in the direction in which vacuum should be sucked through the filter.

The chamber in the cylindrical body portion 46 is stepped in size providing a pair of cylindrical walls 48 and 49 of different diameters and a pair of annular shoulders 50 and 51 at ends of said walls. It is to the outer end of the cylindrical wall 48, which is the wall of greatest diameter, that the end plug 44 is threadably connected and sealed by a gasket 52. Removably supported in the larger portion of the chamber formed by the wall 48 and held in place by engagement with said wall, 48 and shoulder 50, and end plug 44 is a screening unit 53, while in the smaller portion of the chamber formed by the cylindrical wall 49 and held in position by the wall 49, screening unit 53, and the shoulder 51 is another but smaller screening unit 54. With the exception of being of different sizes and different mesh screening material, the two removable screening units are of the same construction, being composed of screen material 55 formed in the shape of a cone with the peripheral edge thereof soldered or otherwise attached to a ring 56 which in turn is likewise secured to one end of a coil spring 57 surrounding the cone-shaped screen and extending beyond the apex thereof. The screening unit 54, while being of smaller diameter than the unit 53 which prevents improper placement of the units in their respective locations, has its screening material 55 of finer mesh for catching and retaining small matter having passed through the coarser screening unit 53 and also has a much weaker coil spring 57 than the spring on the unit 53 for assuring contact of the unit 53 with the shoulder 50 when the units are assembled in the casing with both springs under compression.

By constructing and associating screen units in a stepped chamber of a casing in the manner set forth above, the screens 55 of the screen units 53 and 54 divide the chamber of the casing into compartments into which is accumulated foreign matter, as indicated by the numerals 58 and 59, respectively. The cone formation of the screens 55 and the directing of the apexes thereof into their respective trapping compartments considerably increases the quantity of foreign matter possible to be collected in the compartments before said screens will be closed off against circulation therethrough and a cleaning or a replacement thereof is required.

From the foregoing, it can be seen that when the trailer control valve 18 on the tractor is manually operated to a position for applying the brakes or upon operation of the tractor hydraulic brakes, air entering the filter or cleaner 17 and passing through the line 14 to the hydrovac 12 is sucked by vacuum through the control valve 18, line 20, cutoff valve 21, hose 22, coupling 29, filter 31, and line 32 reducing negative pressure of a partial vacuum in the relay valve 33 and thereby causing an operation of the relay valve communicating the brake compartments 37 with the source of vacuum supply which is through the tank 35, emergency check valve 34, line 30, coupling 28, hose 25, filter 26, cutoff valve 24, line 23, line 13, and check valve 16 to the pump 19, thus causing the brakes of the trailer to be applied. All foreign matter having entered uncoupled ends of the lines will be immediately sucked to either of the filters where said matter is caught and retained upon recoupling of the lines and will not be circulated to a vital part of the system where line 15, operation of the part could be affected by the presence of such foreign matter.

While I have shown improved filters 26 and 31 in the vacuum line and control line of a vacuum brake system at locations between certain other parts of the braking system for preventing the circulation through the system of foreign matter that may have entered uncoupled ends of said line, it is to be understood that the filters 26 and 31 may be at other locations of a vacuum brake system or an air brake system and perform satisfactorily the function intended. Furthermore, if desired, additional filters may be employed by installing a filter near each coupled end of both lines for accomplishing the same purpose. Should there be a likelihood that an owner's equipment be coupled at any time to either tractors or trailers not having filters, he, in order to protect the lines of his equipment, should equip both lines of both his tractors and trailers with filters.

In view of the foregoing description taken in conjunction with the accompanying drawing, it is believed that a clear understanding of the construction, operation, and advantages of the device will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. In combination with a tractor and trailer vacuum brake system for controlling the brakes of the trailer from the tractor including a brake mechanism on the trailer, a vacuum creating mechanism on the tractor, a vacuum service line connecting the vacuum creating mechanism on the tractor with the brake mechanism on the trailer, a brake control mechanism on the tractor, a vacuum control line connecting the brake control mechanism on the tractor to the trailer brake mechanism, and couplings in said vacuum service line and said vacuum control line for disconnecting the portions of the lines on the tractor from the portions of the lines on the trailer; a filter in said vacuum service line between the coupling therein and said vacuum creating mechanism on the tractor, and another filter in said vacuum control line between its coupling and the trailer braking mechanism, said filters being positioned in the uncoupled end portion of each of said lines into which negative pressure is sucked when the two uncoupled ends of each line are recoupled for catching and retaining foreign matter accumulated in the uncoupled ends of the lines upon coupling of said lines.

2. In combination with a tractor and trailer vacuum brake system for controlling the brakes of the trailer from the tractor including a brake mechanism on the trailer, a vacuum creating mechanism on the tractor, a vacuum service line connecting the vacuum creating mechanism on the tractor with the brake mechanism on the trailer, a brake control mechanism on the tractor, a vacuum control line connecting the brake control mechanism on the tractor to the trailer brake mechanism, and couplings in said vacuum service line and said vacuum control line for disconnecting the portions of the lines on the tractor from the portions of the lines on the trailer; filters in said vacuum service line and in said vacuum control line and positioned in the uncoupled end portion of each of said lines into which negative pressure is sucked when the two uncoupled ends of each line are recoupled for catching and retaining foreign matter accumulated in the uncoupled ends of the lines upon coupling of said lines.

References Cited in the file of this patent

UNITED STATES PATENTS

| | | |
|---|---|---|
| 1,103,306 | Maher | July 14, 1914 |
| 1,577,088 | Williston | Mar. 16, 1926 |
| 1,620,266 | McCarthy | Mar. 8, 1927 |
| 2,192,968 | Fieser | Mar. 12, 1940 |
| 2,335,825 | Eaton et al. | Nov. 30, 1943 |
| 2,345,380 | Kirk | Mar. 28, 1944 |
| 2,418,666 | Rockwell | Apr. 8, 1947 |
| 2,429,194 | Price | Oct. 14, 1947 |
| 2,434,050 | Price | Jan. 6, 1948 |
| 2,467,813 | Coney | Apr. 19, 1949 |